(12) United States Patent
Enns et al.

(10) Patent No.: US 10,305,887 B2
(45) Date of Patent: May 28, 2019

(54) METHOD AND SYSTEM FOR HAND HELD TERMINAL SECURITY

(71) Applicant: Trilliant Networks, Inc., Redwood City, CA (US)

(72) Inventors: Frederick Enns, Menlo Park, CA (US); Michel Veillette, Waterloo (CA); Francis Lacasse, Shefford (CA)

(73) Assignee: Trilliant Networks Inc., Redwood City, CA (US)

( * ) Notice: Subject to any disclaimer, the term of this patent is extended or adjusted under 35 U.S.C. 154(b) by 81 days.

(21) Appl. No.: 15/376,833

(22) Filed: Dec. 13, 2016

(65) Prior Publication Data

US 2017/0180355 A1    Jun. 22, 2017

Related U.S. Application Data

(60) Provisional application No. 62/267,994, filed on Dec. 16, 2015.

(51) Int. Cl.
*H04L 29/06* (2006.01)
*H04W 12/04* (2009.01)
*H04W 12/06* (2009.01)

(52) U.S. Cl.
CPC .......... *H04L 63/0823* (2013.01); *H04L 63/06* (2013.01); *H04L 63/062* (2013.01); *H04L 63/10* (2013.01); *H04W 12/04* (2013.01); *H04W 12/06* (2013.01)

(58) Field of Classification Search
CPC ..... H04L 63/0823; H04L 63/10; H04L 63/06; H04L 63/062; H04W 12/06; H04W 12/04
See application file for complete search history.

(56) References Cited

U.S. PATENT DOCUMENTS

| | | | | |
|---|---|---|---|---|
| 6,816,900 B1 * | 11/2004 | Vogel | ................... | H04L 9/3236 709/203 |
| 7,290,133 B1 * | 10/2007 | Montgomery | ........ | H04L 9/3263 713/156 |
| 8,214,634 B1 * | 7/2012 | Steele | ................... | H04L 9/3268 713/152 |

(Continued)

FOREIGN PATENT DOCUMENTS

WO    WO-2013151768 A1    10/2013

OTHER PUBLICATIONS

International Search Report and Written Opinion dated Mar. 29, 2017 for PCT Application No. PCT/US2016/066273.

*Primary Examiner* — Chau Le
(74) *Attorney, Agent, or Firm* — Moser Taboada

(57) ABSTRACT

A computer implemented method and apparatus for authenticating a field tool by a field device comprising: receiving, on a field device, an authentication certificate; verifying the authentication certificate using a trust anchor certificate on the field device; securing communication between the field tool and the field device with a key generated by a key derivation method using exchanged certificates; receiving a field tool task authorization certificate; verifying the authorization certificate using a trust anchor certificate on the field device; receiving a task request to perform a task by the field tool; and determining whether the task is authorized based on the task authorization certificate; and performing the task on the field device when it is determined the task is authorized.

20 Claims, 5 Drawing Sheets

(56) References Cited

U.S. PATENT DOCUMENTS

| | | | | |
|---|---|---|---|---|
| 8,312,263 | B2* | 11/2012 | Bell | H04L 9/3268 |
| | | | | 713/156 |
| 2005/0076198 | A1* | 4/2005 | Skomra | H04L 9/321 |
| | | | | 713/156 |
| 2005/0188193 | A1* | 8/2005 | Kuehnel | G06F 21/445 |
| | | | | 713/155 |
| 2005/0257058 | A1* | 11/2005 | Yoshida | H04L 29/06 |
| | | | | 713/175 |
| 2006/0168443 | A1* | 7/2006 | Miller | H04L 63/0823 |
| | | | | 713/156 |
| 2006/0174124 | A1* | 8/2006 | Bell | H04L 9/3268 |
| | | | | 713/176 |
| 2008/0134309 | A1* | 6/2008 | Qin | G06F 21/105 |
| | | | | 726/6 |
| 2009/0326981 | A1 | 12/2009 | Karkanias et al. | |
| 2011/0145894 | A1 | 6/2011 | Garcia et al. | |
| 2015/0170292 | A1 | 6/2015 | Fung et al. | |
| 2017/0250827 | A1* | 8/2017 | Opschroef | H04L 9/006 |

* cited by examiner

METHOD AND SYSTEM FOR HAND HELD TERMINAL SECURITY

This application claims benefit of U.S. Provisional Application Ser. No. 62/267,994, filed Dec. 16, 2015, which are herein incorporated by reference in its entirety.

BACKGROUND OF THE INVENTION

Field of the Invention

Embodiments of the present invention generally relate to computer security and more specifically, to a method for providing an ability to limit attacks on un-commissioned utility field devices and on field devices by maintenance field tools.

Description of the Related Art

A hand held terminal (HHT) is a portable tool that is used to access field devices, such as smart meters, sensors and controllers, for tasks that include commissioning, management, firmware updates, diagnostics, and data reading. The HHT connects to a meter using wired or wireless communication links between the HHT and the meter. HHTs can be used to perform the above mentioned tasks even when a meter is not configured and is not connected or has never been connected to a network.

Due to the fact that HHTs can perform such vital tasks on a field device, security for the communication between HHTs and filed devices is an important concern. An HHT may be lost, or may not be returned when a user of the HHT leaves a company. Authenticating an HHT or limiting the tasks an HHT is authorized to perform on a field device using certificates are common techniques to limit attacks. However, a field device that has never been connected to the utility's network is at risk even with current techniques because until the device is configured and connected to the network, the device is unable to authenticate the HHT using a certificate chain to a utility's root certificate authority. Another aspect of this security is to restrict what tasks individual HHT's are authorized to perform in order to accommodate service technician roles that vary from simple meter reading to device reconfiguration and maintenance.

In addition, efficiently deploying large numbers of devices using HHTs is of critical concern to the manufacturer and the utility.

Therefore, there is a need for a method and apparatus for authentication techniques to prevent attacks on un-commissioned devices and securely limit the tasks that a field tool is authorized to perform.

SUMMARY OF THE INVENTION

A computer implemented method and apparatus for authenticating a field tool by a field device comprising: receiving, on a field device, an authentication certificate; verifying the authentication certificate using a trust anchor certificate on the field device; securing communication between the field tool and the field device with a key generated by a key derivation method using exchanged certificates; receiving a field tool task authorization certificate; verifying the authorization certificate using a trust anchor certificate on the field device; receiving a task request to perform a task by the field tool; and determining whether the task is authorized based on the task authorization certificate; and performing the task on the field device when it is determined the task is authorized.

These and other features and advantages of the present disclosure may be appreciated from a review of the following detailed description of the present disclosure, along with the accompanying figures in which like reference numerals refer to like parts throughout.

Figure 1:
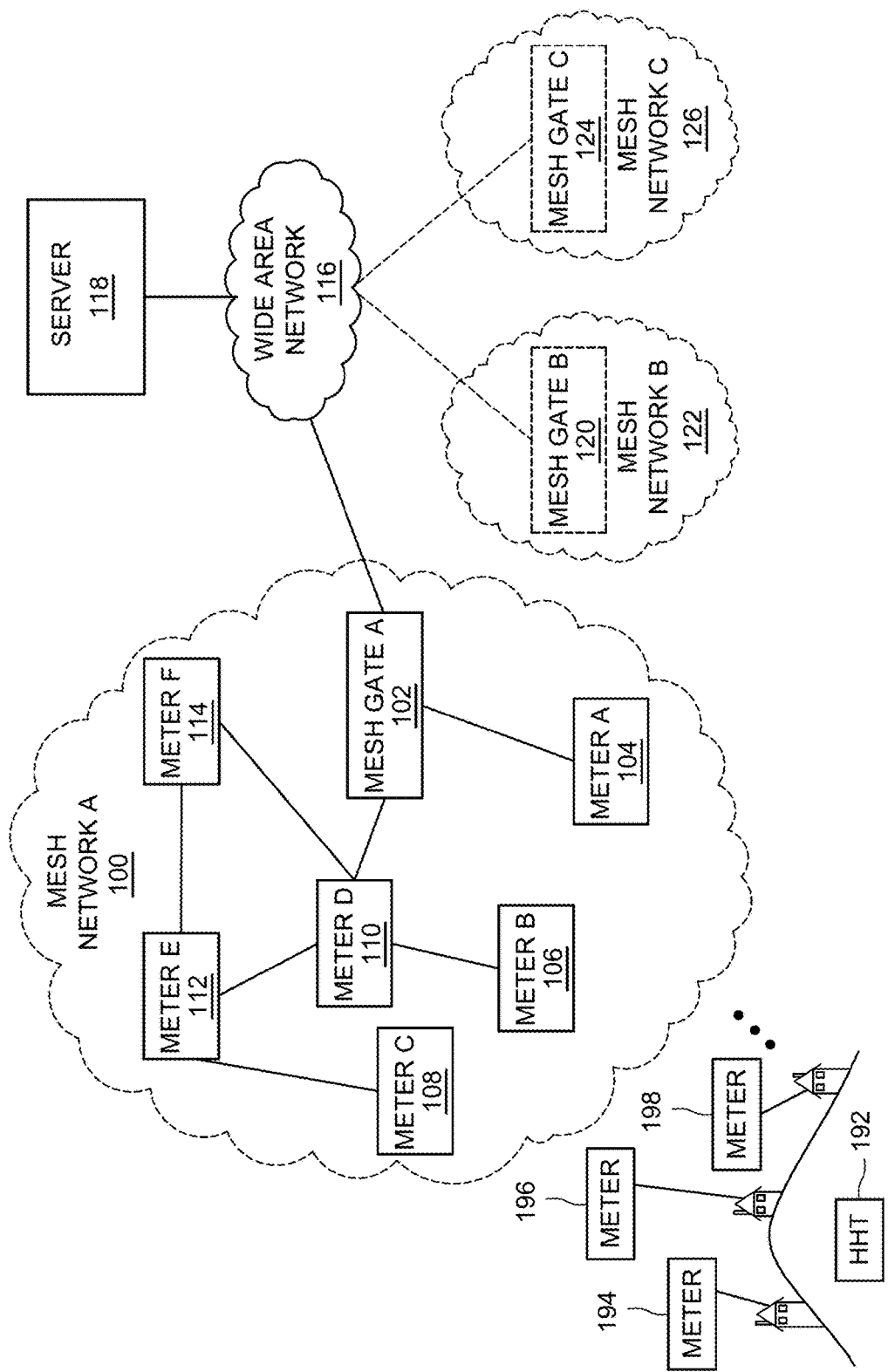
FIG. 1 depicts a block diagram of an exemplary smart meter system for providing authentication techniques for un-commissioned devices as well as exemplary for smart grid, and Internet-of-Things (IoT) systems where the meter devices are generic devices, according to one or more embodiments of the invention.

While the method and apparatus is described herein by way of example for several embodiments and illustrative drawings, those skilled in the art will recognize that the method and apparatus for authentication techniques for un-commissioned devices is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for authentication techniques for un-commissioned devices defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the invention provide systems and methods for authenticating hand held terminals (HHT) used to perform tasks on un-commissioned and commissioned devices, such as smart utility meters, Distribution Automation (DA) devices, and smart city Internet of Things (IoT) devices. Embodiments of the present invention use factory installed trust anchor certificates and authentications certificates on un-commissioned devices, and trust anchors and authentication certificates on the HHT to mutually authenticate each other and to authorize HHT actions, thereby enabling the field device to have secure communications with the HHT without network access to a head end system.

An un-commissioned device is a device that includes only the information provisioned by the manufacturer. The commissioning process involves setting utility and network specific information settings, the generation of device certificates, and the setting of operating modes in the device. The utility information may include utility certificates that are used as trust anchors to validate other certificates. A device may be commissioned over the network by a head end system. When the device does not have access to a network, the device may be commissioned by a HHT.

Various embodiments of a method and apparatus for HHT security are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. As used herein, the terms "field tool" and "HHT" are used interchangeably.

FIG. 1 depicts a block diagram of an exemplary smart meter system, according to one or more embodiments of the invention. A mesh network A 100 may include a neighborhood area network (NAN) access point (e.g., mesh gate A) 102 and a plurality of mesh devices, for example, meters A 104, B 106, C 108, D 110, E 112, and F 114. A NAN access point may be referred to herein as a mesh gate or a NAN-WAN gate. The mesh gate A 102 may communicate with a server 118 over a wide area network (WAN) 116 and it will be appreciated that any number of mesh gates may communicate with the server 118 (e.g., mesh gate B 120 and mesh gate C 124).

In addition to the mesh gate A 102, the mesh network A 100 may include a plurality of devices, e.g., meters (as shown) or communication hubs, which cover a geographical area. The devices may be in communication with or may otherwise include one or more utility sensors and controllers for monitoring and controlling utility services, such as gas, water, or electricity services and usage patterns at a specific customer location. In some embodiments, devices may also include thermostats, user displays, and other components for monitoring and controlling energy usage.

The meters A 104, B 106, C 108, D 110, E 112, and F 114 may be associated with the mesh network A 100 through direct or indirect communications with the mesh gate A 102. Each meter may forward transmissions from other meters within the mesh network A 100 to and from the mesh gate A 102. It will be appreciated that while only six meters are depicted in the mesh network A 100, any number of mesh devices may be deployed to cover any number of utility lines or locations, subject to bandwidth constraints with the mesh network and the mesh gate. The Hand Held Terminal (HHT) 192 can be moved to within the required communication range of any of the meters A 104, B 106, C 108, D 110, E 112 or F 114 and perform configuration, reading, and maintenance operations.

As depicted, only meters A 104 and D 110 are in direct communications with mesh gate A 102. However, meters B 106, E 112 and F 114 can all reach mesh gate A 102 through meter D 110. Similarly, meter C 108 can reach mesh gate A 102 through meter E 112 and meter D 110. Accordingly, meter A 104 may be described as being 1 "hop" from mesh gate A 102; meter D 110 may be described as being 2 "hops" from mesh gate A, and meter C 108 may be described as being 3 "hops" from mesh gate A.

It will be appreciated that the WAN 116 may be any communication medium capable of transmitting digital information. For example, the WAN 116 may be the Internet, a cellular network, a private network, a phone line configured to carry a dial-up connection, another wireless mesh network, or any other network. It will also be appreciated that the WAN 116 may be a simple point-to-point link between the Mesh Gate A 102 and the Server 118. Although the present disclosure describes embodiments of the invention using a mesh network, it will also be appreciated that the present invention is not dependent on type of network formed by the system. The device may be part of a tree routed network, a star network and any other network topology.

The head end system server 118 may be a computing device configured to receive information, such as status change information, meter readings, or any other data from a plurality of mesh networks and meters. The server 118 may also be configured to transmit instructions to the mesh networks, mesh gates, and mesh devices. In certain embodiments, the server 118 may be a central processing system including one or more computing systems (i.e., one or more server computers). Where the head end includes more than one computing system, the computing systems can be connected by one or more networks and the system may be referred to as a "backhaul network" or back end system. The mesh networks, e.g., mesh network B 122 and mesh network C 126 are similar to mesh network A 101 in operation, and as discussed above.

Meters 194, 196, 198 are a group of meters that are located in a geographic location that does not have access to a mesh network or a group of un-commissioned meters that do not have access to the network and therefore cannot connect with a mesh gate to reach the server 118. As such, a hand held terminal (HHT) 192 is used to perform tasks on the meters 194, 196, and 198. The HHT 192 is a portable tool that is used to access meters for tasks that include commissioning, management, control, firmware updates, diagnostics, and data reading. Although described as a hand held terminal device, in some embodiments the HHT 192 may be fixed to a vehicle, aircraft, drone, or other movable/portable object and can be moved/positioned within a desired communication range of meters 194, 196, and 198. The HHT 192 connects to the meter using wired or wireless communication.

The HHT 192 must communicate securely with a device that is not connected to the operational network (e.g., meter 194), and with devices that are part of the operational network (e.g., mesh network A 100, mesh network B 122, mesh network C 126). Although the present description describes the communication between HHT 192 and meter 194, which has not connected to network A 100, as well as devices connected to A 100, those skilled in the art will appreciate that the present disclosure also applies to un-commissioned devices that are not able to communicate with the network, either because the device cannot reach the network or due to the fact that the device is not configured to connect to the network. Said un-commissioned devices do not configured with Utility trust anchors or Utility signed certificates.

The HHT 192 must establish that the meter (e.g. 104) with which it is communicating is a trusted device. For example, falsified information (e.g., low energy usage information) may be provided to an HHT 192 by an unauthorized user using counterfeit devices in order to lower their monthly utility bills. In addition the meter 104 must establish that the HHT 192 that is attempting to communicate with it is accredited by a recognized authority and is not a misappropriated HHT (e.g., lost, stolen, or used for an unauthorized task).

Different HHT users have different task authorizations. For example, a system operator may employ a number of meter reading personnel that have been trained for the task of meter reading, but are not trusted or authorized to maintain the meters. Maintenance tasks may only be performed by authorized field service technicians. The HHT 192 may be the same for both sets of users; however the meter 194 must establish which tasks a given user has been authorized to perform by the accrediting authority.

Figure 2:
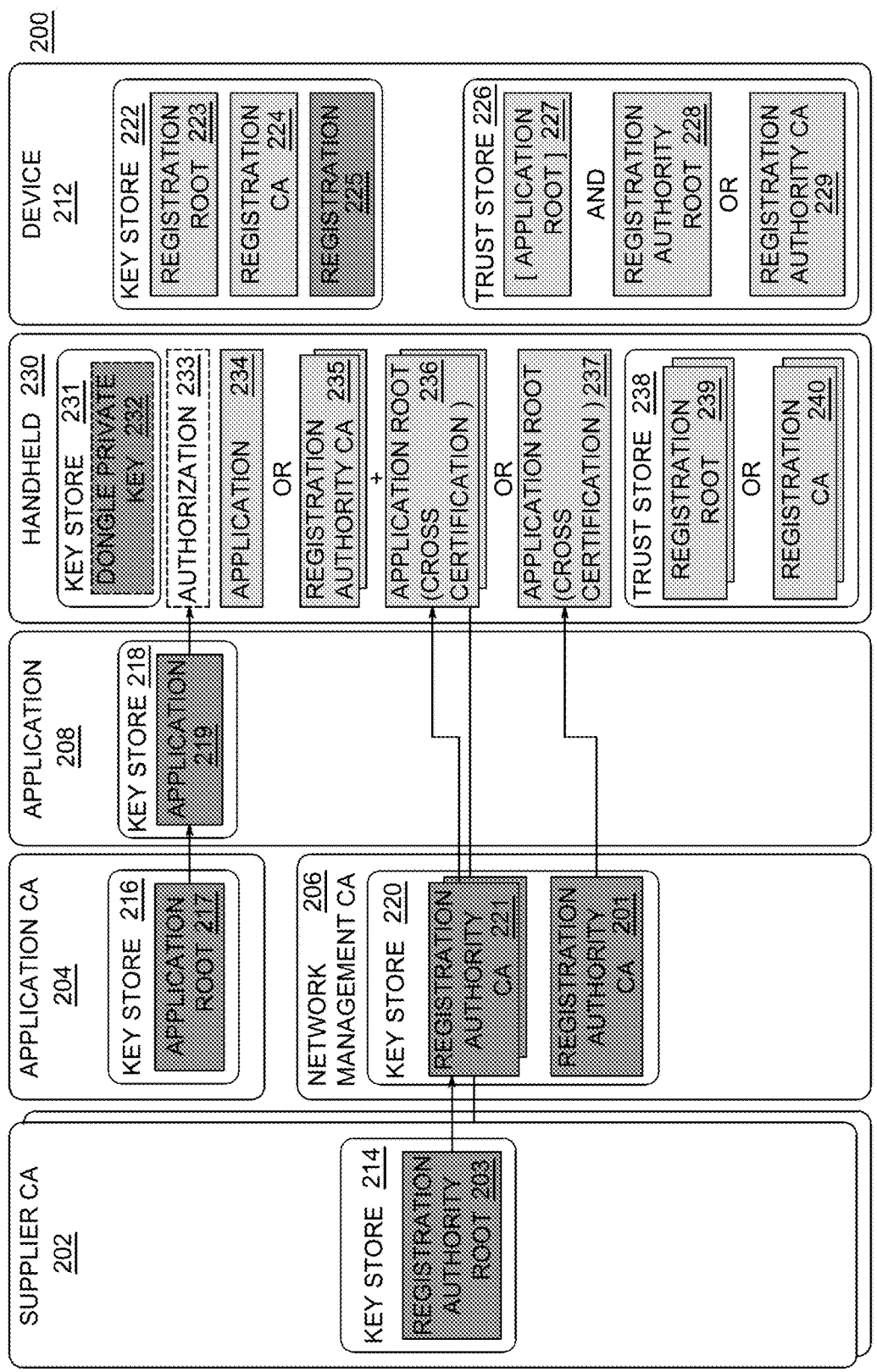
FIG. 2 depicts a block diagram of the certificate hierarchy that enables an device to authenticate and authorize a field tool, according to one or more embodiments of the invention.

FIG. 2 depicts an exemplary block diagram of the certificate hierarchy 200 that enables a device (e.g., a meter) to authenticate and authorize a HHT, according to one or more embodiments of the invention. The certificate hierarchy 200 uses hierarchy certificates for TLS/DTLS security. Certificates are verified using a chain of trust. The trust anchor for the certificate is a Root Certificate Authority (CA). A CA can issue multiple certificates in the form of a tree structure. The root certificate is the top-most certificate of the tree, a private key of which is used to "sign" other certificates. All certificates signed by the root certificate inherit the trustworthiness of the root certificate. Certificates further down the tree are trusted if signed by a trusted certificate. A certificate chain is a list of certificates, usually starting with an end-entity certificate, followed by one or more certificates, usually the last one being a self-signed root certificate (i.e., trust anchor). The root certificate is usually made trustworthy by some mechanism other than the certificate, such as by secure physical distribution from a trusted source and placement into a device's trust store memory. The details and functionality of certificates can be found in the Internet Engineering Task Force (IETF) Request for Comments (RFC) Paper No. 5280, entitled "PKIX Certificate and CRL Profile", that is herein incorporated in its entirety by reference.

As shown in FIG. 2, the certificate hierarchy 200 includes a Supplier Certificate Authority (CA) 202, an Application CA 204, a Network Management CA 206, and Application 208. Application CA 204, a Network Management CA 206, and Application 208 may reside on a server (e.g., Head-End Server 118). The certificates (e.g., Registration Authority Root 203, Application root 217, Registration Authority CAs 201 and 221, Application 219, and Registration 225) depict a certificate along with the private key of the certificate. The certificates (e.g., Application 234, Registration Authority CA 235, Application Root 236, Application Root 237, Registration Root 239, Registration Root 240, Registration Root 223, Registration CA 224, Application Root 227, Registration Authority Root 228, and Registration Authority CA 229) depict only a certificate.

The Supplier CA 202 is the supplier (i.e., manufacturer) of the Device 212. The Supplier CA 202 includes Key store 214 that contains the Registration Authority Root 203 certificate and its private key. The Registration Authority Root certificate 203 is a self-signed certificate that is used as the trust anchor during the commission process of a device. A trust anchor is an authoritative entity for which trust is assumed (i.e., the trust anchor comes from a trusted source, the manufacturer, and it is protected from unauthorized modification). The Application CA 204 is managed by a utility company, (e.g., electricity company, gas company, or IoT company). The Application CA 204 includes a Key store 216, which contains an Application Root 217 certificate and private key. The Application Root 217 certificate is the trust anchor for the Head-End system's applications' Application 219 certificates in Key store 218 that is used to secure TLS/DTLS communications, authorize tasks, and authenticate sources.

The Network Management CA 206 is also managed by the utility company. The Network Management CA 206 includes Key store 220. The Key store 220 contains the Registration Authority CA 221 certificate and its private key for each supplier. The Registration Authority CA 221 certificate is signed by a supplier's Registration Authority Root 203 private key. The Registration Authority CA 201 certificate is self-signed by the utility. The Key store 220 contains whichever version is needed by the utility's devices. The self-signed Registration Authority CA 201 is used when the manufacturer provisions the Device 212 Trust store 226 with the utility's Registration Authority CA 229 certificate, which must match the Registration Authority CA 201 certificate. The supplier signed Registration Authority CA 221 certificate is used when the device 212 is not provisioned with the utility's Registration Authority CA 201 certificate. In this case the device's Trust store 226 contains the supplier's Registration Authority Root 228 certificate that must match the Registration Authority Root 203 certificate. For each Supplier CA 202 there is a Registration Authority CA 221 certificate in the Key store 220. These certificates in the Key store 220 are used in the trust chain to secure TLS/DTLS un-commissioned device sessions with utility head end and TLS/DTLS device authentication with the HHT.

The Application 208 is an application process in the Head End System (e.g., server 118). An embodiment of an Application 208 is a process that manages one or more HHTs 230. The public/private key pair for an Application 219 certificate is created by the Application 208. The Application 219 certificate in Key store 218 is signed by the private key of the Application Root 217. The Application 208 also manages the Authorization 233 certificate that is signed by the private key of the Application 219 certificate. The Application 208 configures the HHT 230 with the credentials needed for the service technician tasks, which includes the Authorization 233 and Application 234 certificates. The Application certificate 234 certificate in the HHT 230 has the public key but not the private key; in order to protect the utility should the HHT fall into the hands of an unauthorized user. Typically, the Application 234 certificate and/or the Authorization 233 certificate has a life of one day, which means the HHT 230 is configured every day and cannot be used after that time in order to secure the HHT 230 in the event the HHT 230 is lost or stolen.

The HHT 230 is a service technician's field tool. It is configured with an Application certificate 234 and an authorization certificate 233 that is signed by a private key of the Application 219. The Application 234 certificate and the Authorization 233 certificate are sent to the device 212 by the HHT 230 at the start of a session to authenticate the HHT 230 and to authorize what tasks the HHT 230 is allowed to perform, as described in further detail with respect to FIG. 3, below. The Authorization certificate 233 may be configured for a specific target device's (Device 230) MAC address or for all devices. Including a target MAC address enhances security by limiting the scope of the HHT. The Authorization 233 certificate may be configured for read only access or read/write access depending on what the utility wants the service technician operating the HHT to do. The Authorization 233 certificate may also be configured to enable the HHT to perform specific tasks such as firmware downloads, and device resets.

The Device 212 includes both a Key store 222 and a Trust store 226. The trust store 226 contains supplier installed root certificates that the Device 212 can use to authenticate and authorize a HHT 230. The Key store 222 contains supplier installed certificates used by the device to authenticate itself to the HHT 230 and to establish secure communications. The supplier generates a Registration Root self-signed certificate and private key. The supplier's manufacturing site then generates the public and private key pair for the Registration CA and has the supplier sign the Registration CA certificate with the private key of the Registration Root. The supplier's manufacturing site then generates the Device 212 Registration public and private key pair and signs the Registration 225 certificate with the Registration CA private key. The supplier's manufacturing site then places the Registration Root 223 certificate, the Registration CA 224 certificate, and the Registration and private key 225 in the Device 212 Key store 222.

Figure 3:
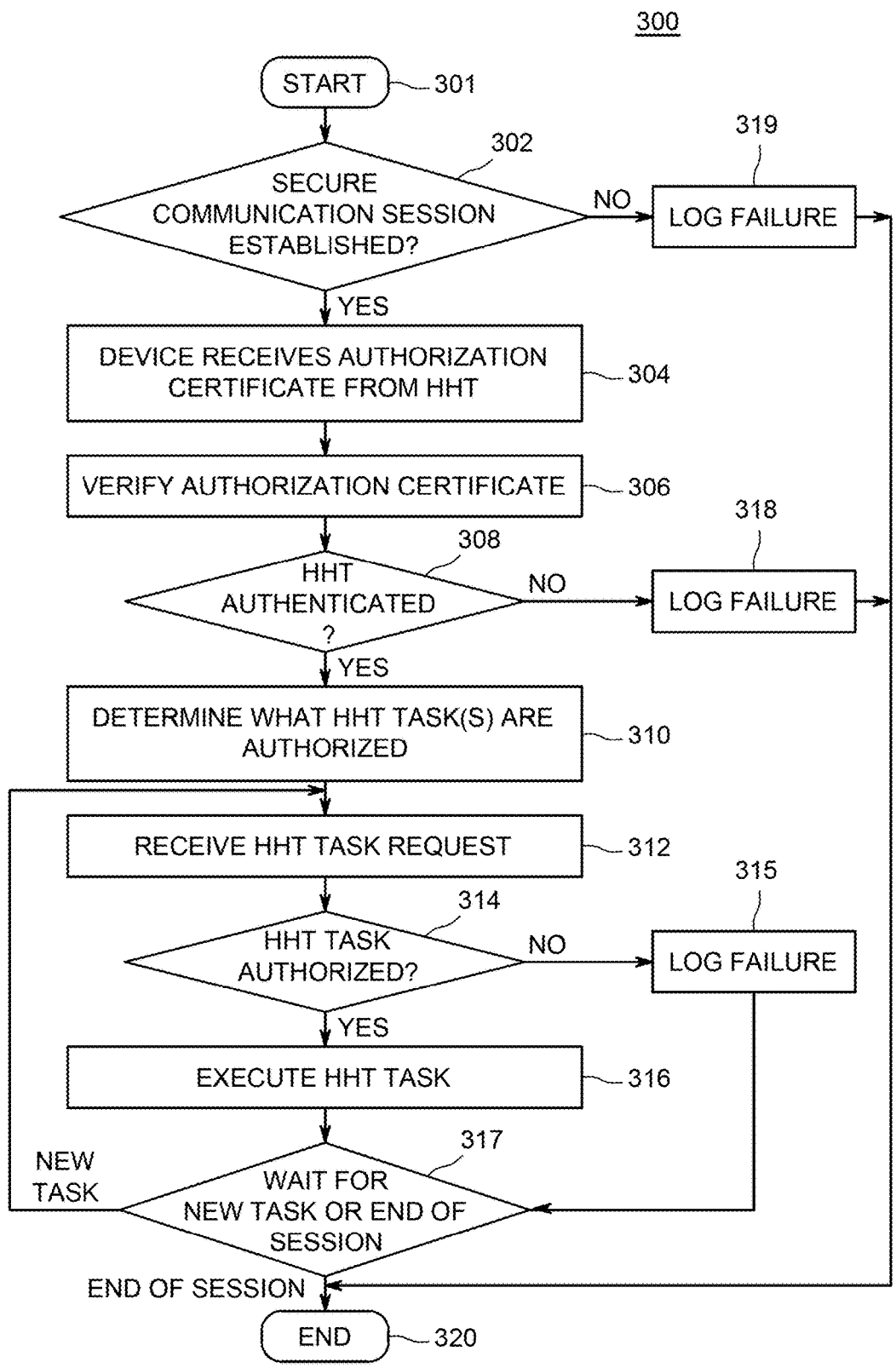
FIG. 3 depicts a flow diagram of a method for hand held security as performed by a device that may never have been connected to a network, according to one or more embodiments of the invention.

FIG. 3 depicts a flow diagram of a method 300 for HHT security as performed by a device and the HHT, according to one or more embodiments of the invention. At step 301, the HHT 230 and the target Device 212 discover each other. This step is accomplished using services provided the network link employed by the HHT to communicate to the device.

At step 302, the HHT 230 initiates a secure communications session with the target Device 212. The HHT provides the device with the Application 234 certificate and either the Application Root 237 cross certificate or the Registration Authority CA 235 certificate and the Application Root 236 cross certificate. The Device 212 provides the HHT 230 with the Registration 225 certificate and the Registration CA 224 certificate. The commissioned device uses the Application Root 227 certificate to authenticate the HHT's Application 234 certificate. The un-commissioned device uses either the Registration Authority Root 228 certificate or the Registration Authority CA 229 certificate as the trust anchor to authenticate the HHT's Application 234 certificate. The Registration 225 certificate and the Application 234 certificate are used by the HHT and the device to do a communication key derivation based on TLS or DTLS. The communication key derivation process is defined in various IETF RFCs. The HHT 230 authenticates the device's Registration 225 certificate and the device in one of two ways depending on how the device was manufactured.

When the device's Registration 225 certificate is signed by a private key of the manufacturing sites Registration CA 224 certificate that has as the trust anchor the supplier's Registration Root 239 certificate, the Device 212 transmits the Registration CA 224 certificate and the Registration 225 certificate and the HHT authenticates them using the Registration Root 239 certificate in is Trust store 238.

When the Registration 225 certificate is signed by the site manufacturer's private key of a self-signed Registration CA 224 certificate, the Device 212 transmits only the Registration 225 certificate and the HHT authenticates it using the Registration CA 2400 certificate in its Trust store 238. The handshake in 302 authenticates the device to the HHT through the presentation of the device's Registration 225 certificate and the use of the public/private key challenge described in the IETF, TLS, or DTLS protocol. Note that the device also has the Registration Root 223 in its Key store 222. This is for recovery purposes only and is not transmitted to the HHT because the device is not a trusted source for the Registration 225 certificate trust anchor.

The HHT authenticates the device 212 based on the list of either the Registration Root 239 trust anchor certificates or the relevant Registration CA 240 certificate in the Trust store 238. The un-commissioned device authenticates the HHT's Application 234 certificate using either the Registration Authority Root 228 certificate or the Registration Authority CA 229 in its Trust store 226 as the trust anchor. If the un-commissioned device has the supplier's Registration Authority Root 228 in its Trust store 226, it will use that as the trust anchor for the trust chain that includes the Registration Authority CA 235 and the Application Root 236 for the HHT's Application 234 certificate. If the device's trust store 226 has the Registration Authority CA 229 certificate, the trust chain is Application Root 237 certificate for the HHT's Application 234 certificate. If the commissioned Device 212 has the utility's Application Root 227 certificate in its Trust store 226. It will use this certificate as the trust anchor to authenticate the Application 234 certificate. As with any certificate used in the method 300, a person skilled in the art will check other certificate fields such as the validity period fields to determine that certificates are valid before they are used.

After the device is authenticated by the HHT, a secure DTLS session key is established. In this embodiment, the HHT 230 communications with the target Device 212 are secured at the Data Link Layer by the DTLS session key and no transport layer security is employed. Other embodiments may establish a session key and use TLS security at the transport layer.

If the establishment of the secure communications fails because of one or more unauthenticated certificates, then the method 300 proceeds to step 319, where the failure is logged. In some embodiments, the failure may be reported depending on the security policy set by the utility administrator or system designer. The method 300 proceeds to step 320 and ends.

If at step 302, the certificates are authenticated and a secure communications session is established, the method 300 proceeds to step 304. At this stage the Device 212 has not fully authenticated the HHT 230 because the private key of the Application 219 certificate is not stored in the HHT Application 219 certificate and the Key store 231. This prevents the private key from being stolen for a lost HHT. The Application 234 certificate in the HHT only has the public key and so it cannot be used to authenticate that the HHT is the rightful owner of the Application 234 certificate in a public/private key challenge. The device 212 can optionally authenticate the HHT later in the method 300 process.

At step 304, an HHT's Authorization 233 certificate is received by the device. The Authorization 233 certificate is sent from the HHT using an application layer protocol such as Constrained Application Protocol (CoAP).

At step 306, the Authorization 233 certificate is verified by the Device 212 to establish what tasks the HHT 230 is authorized to perform with the device. The Device 212 accesses the Trust store 226 to determine whether the Authorization 233 certificate is signed by a trusted authority (i.e., a trust anchor). Due to the fact that the device may not be able to access a network and may not be commissioned, the Trust store 226 containing the trust anchors is initially factory configured. In the case where the Device 212 is commissioned, it has the utility's Application Root 227 certificate in the Trust store 226 and it authenticates the Authorization 233 certificate with the Application 234 certificate signed by the private key of the Application Root 217 certificate as trust anchor. In the case where the Device 212 is not commissioned, there is no Application Root 227 certificate in the Trust store 226. However, the un-commissioned Device 212 has only either the manufacturing Registration Authority Root 228 certificate or the Registration Authority CA 229 certificate. If the Device 212 has the Registration Authority Root 228 certificate, the Device 212 authenticates the Authorization 233 certificate with the Application Root certificate 236 signed by the Registration Authority CA 221 certificate which has the Registration Authority Root 228 certificate as the trust anchor. In the case where the un-commissioned Device 212 has the utility's Registration Authority CA 229 certificate in the Trust store 226, then Device 212 uses the Application Root 237 certificate sent by the HHT to authenticate the Authorization 233 certificate with the Registration Authority CA 229 as the trust anchor. The device may fail to verify Authorization 233 certificate. This does not end the process because the HHE 230 may have more than one Authorization 233 certificate if it has multiple roles. The Device 212 may log and report failures to verify an Authorization 233 certificate.

In step 302 the device authenticates the HHT's Application 234 certificate, but this does not prove that the HHT is the authorized owner of that certificate because the HHT does not have the private key associated with the Application 234 certificate and a public/private key challenge is not possible. To solve this problem, the device may optionally authenticate that the HHT is the authentic owner of the Application 234 certificate through the HHT's unique Dongle Private Key 232. To do this the HHT generates a dongle public/private key pair and sends the public key to the Application 208 process prior to being configured with the Application 234 certificate. The authentication is done by placing the HHT's dongle public key in a field of the Application 219 certificate that is then signed by the private key of the Application Root 217. The Application 208 program then configures the HHT with the Application 234 certificate. The Device 212 authenticates the HHT 230 by challenging it with an encrypted random number using the dongle public key it received in the Application 234 certificate. The HHT 230 decrypts the random number using the Dongle Private Key 232 and sends it back to the device. If the Device 212 sees that the number is the same it proves that the HHT 230 has the Dongle Private Key 234 that is associated with the dongle public key in the Application 234 certificate. If the Dongle Private Key 232 is securely stored in the HHT, no other HHT or imposter can have this key because it is never shared with another device or exposed outside of the HHT. Placing the dongle private key in the Application 234 certificate prevents any other HHT from using the Application certificate assigned to HHT 230.

At step 308, it is determined whether the authentication of the HHT failed either because a certificate in the trust chain failed to be authenticated in 306 or the dongle public key in the Application 234 certificate failed the challenge test in 306. If the authentication of the HHT fails, the process proceeds to step 318 where an error is logged and the device stops communicating with the HHT. In some embodiments, an error report is sent to the HHT if an error report is required by either the utility security policy or the system designer security policy. The method 300 then proceeds to step 320 and ends.

However, if at step 308 the HHT is authenticated by the device the process proceeds to step 310, where the device determines what tasks the HHT is authorized to perform. In some embodiments, the Authorization 233 certificate may include a list of, or information associated with, the authorized tasks that the HHT may perform. In some embodiments, the Authorization 233 certificate may include a list of, or information associated with, the tasks that the HHT may not perform. In some embodiments, the Authorization 233 certificate contains information on what specific devices such as 194, 196, 108, 112, and 110 in FIG. 1 the HHT can issue tasks for. In some embodiments, the Authorization 233 certificate can specify that it works for all devices. The device determines from the Authorization 233 certificate, what tasks may be performed on the device by the HHT 230. Note that this embodiment shows one Authentication 233 certificated as being sent at the beginning of the session. However, there can be multiple Authentication 233 certificates available to the HHT 230 any of which could be sent at any time during the session to accomplish the tasks the service technician may need to perform.

At step 312, a task request is received by the Device 212 from the HHT 230 on the secured communication link. The task may include, but is not limited to, commissioning the device, performing a firmware update, performing diagnostics, reading a meter, and the like.

At step 314, the Device 212 determines whether the HHT 230 is authorized to perform the task. The device accesses the Authorization 233 certificate(s) to determine whether to execute the requested task. For example, if, based on an Authorization 233 certificate, the HHT 230 is authorized to perform tasks A, B, C, and G and a task request is received to perform task F, the Device 212 will not execute the task. If the Device 212 determines the task is one that is authorized to be performed by the HHT 230, then at step 316, the device executes the task and sends any results or status message back to the HHT. The status and message sent in step 316 is dependent on the application language used by the HHT and device. At step 317, the Device 212 waits either for another HHT task or an end to the communication session.

However if at step 314, the Device 212 determines that the HHT 230 is not authorized to perform the requested task or if the device has received no verified Authorization 233 certificate, then at step 315 the Device 212 logs that a task was not performed and sends whatever response to the HHT 230 is required by the application protocol. In some embodiments, the message sent in step 315 may be an error code or other signal/indication that the task failed, but care should be taken that the information does not enhance a foe's ability to attack the system. In some embodiments, the task authorization failure does not cause the HHT and device communications to halt. In some embodiments the security policy may be to halt communications when the HHT tries to execute an un-authorized task.

At step 317, the method 300 waits for more tasks or an end to the communication session. If at step 317, the communication session is ended, the HHT 230 and the Device 212 halt all communications on the secured link, erase the DTLS security key that was established in step 302, and erase any Authorization 233 certificates the Device 212 has received from the HHT 230. The method 300 proceeds to step 320 and ends. If at step 317, a new task is received, the method 300 proceeds to step 312, and iterates until at step 317, the communication session ends and the method 300 ends at step 320.

Figure 4:
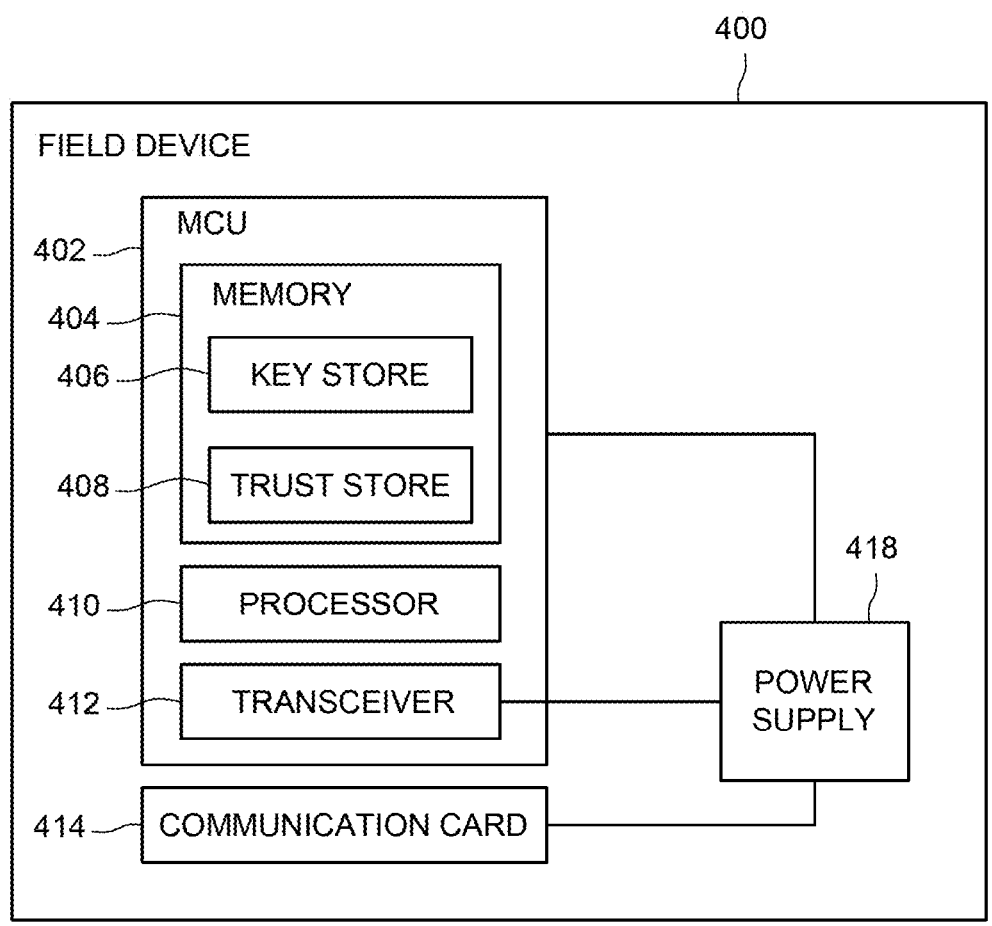
FIG. 4 depicts a block diagram of an exemplary field device for use in field tool security, according to one or more embodiments of the invention.

FIG. 4 depicts a block diagram of an exemplary field device 400 for use in field tool security, according to one or more embodiments of the invention. A device 400 may include a microcontroller unit (MCU) 402, a communication card 414, and a battery, other power or energy storage device or power supply 418. The MCU 402 may include a memory 404, a processor 410, and a transceiver 412. The memory 204 includes a key store 406 (e.g., key store 222) and a trust store 408 (e.g., trust store 226) for performing field tool authentication as described with respect to FIG. 2 and FIG. 3, above. Generally, the communication card 414 may interface between the MCU 402 and a wired or wireless network. The memory 404 may store instructions and run-time variables for execution. For example, the memory 404 may include both volatile and non-volatile memory. The memory 404 may also store an incoming queue of server instructions.

A field device 400 may communicate with an access point and other devices over a network. For example, the field device 400 may be an electricity smart meter installed in a residential building or other location to monitor electricity usage. The meter may also control access to energy in response to server instructions, for example, by reducing or stopping the flow of electricity. The field device 400 may be a mesh gate.

Figure 5:
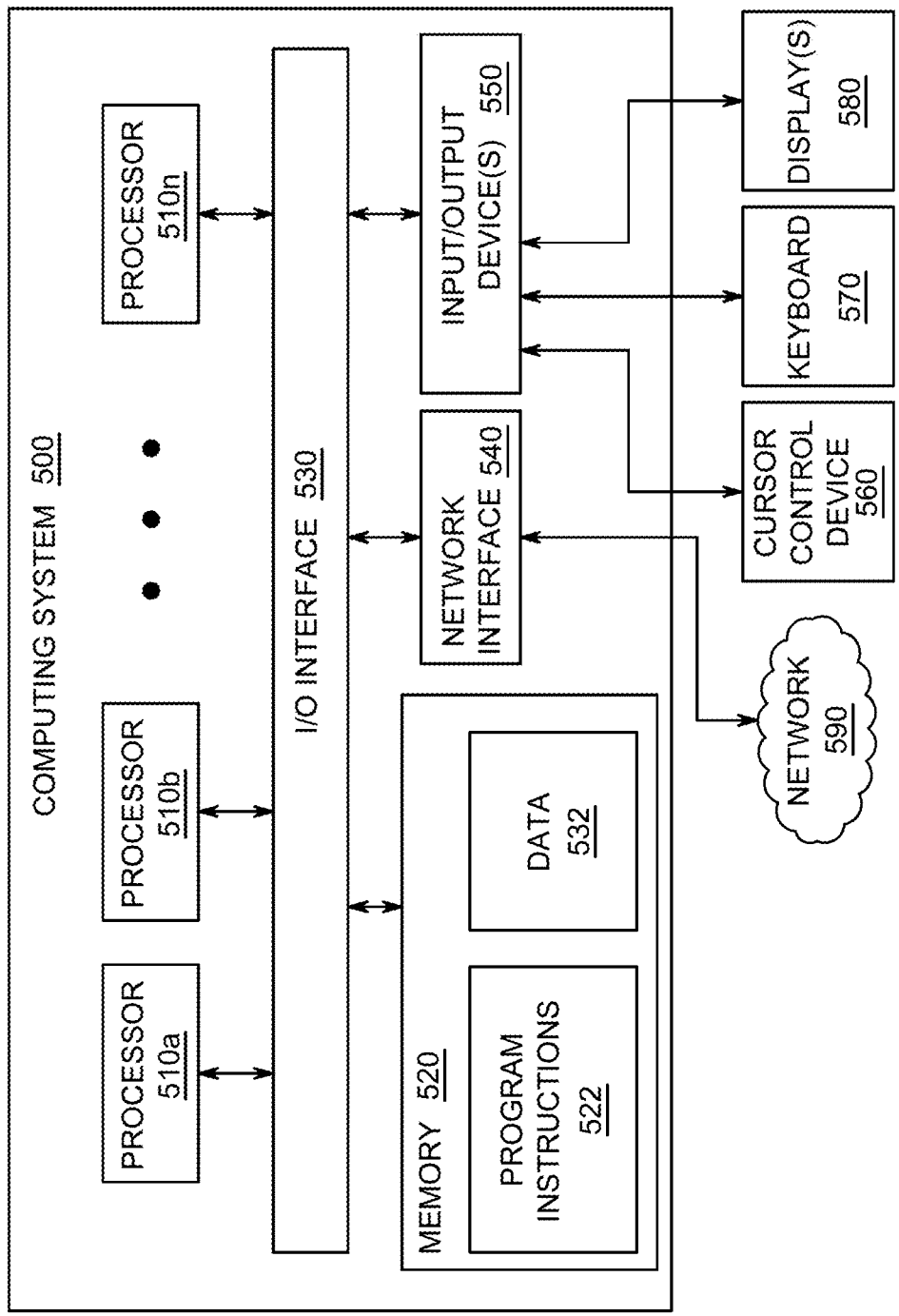
FIG. 5 depicts a computer system that can be utilized in various embodiments of the present invention to implement the computer and/or the display, according to one or more embodiments of the invention.

FIG. 5 depicts a computer system 500 that can be utilized in various embodiments of the present invention to implement the Server 118 computer and/or the display, according to one or more embodiments.

The Server 118 computer system supports the functions of the Application CA 204, Application 208 and Network Management CA 206 as well as other head end system function. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the configuration of the HHT(s) and devices as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA. One embodiment of the Computer System 500 places the Key stores 216, 220 and 218 in one or more Processors 510 that are a Hardware Security Module (HSM). The HSM provides enhanced security for the sensitive cryptographic information and processes.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, cellular data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol. The Network Interface 540 may also include security devices such as firewalls and Virtual Private Network VPN servers.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A computer implemented method for authenticating a field tool by a field device comprising:
    receiving, on the field device, an authentication certificate;
    verifying the authentication certificate using a trust anchor certificate on the field device;
    securing communication between the field tool and the field device;
    receiving a field tool task authorization certificate;
    verifying the task authorization certificate using the trust anchor certificate on the field device;
    receiving, from the field tool, a request to perform a task; and
    determining whether the task is authorized based on the task authorization certificate; and
    performing the task on the field device when it is determined the task is authorized.

2. The method of claim 1, further comprising:
    determining, from the authorization certificate, a list of field devices with which the field tool is authorized to communicate; and
    verifying that the field device is on the list of field devices.

3. The method of claim 1, wherein the communication between the field tool and the field device is secured with a key, wherein the key is generated using a device certificate and a field tool certificate.

4. The method of claim 1, wherein a public/private key challenge is used to authenticate the field tool using a public key of the field tool, supplied to the field tool in the authentication certificate supplied by the field tool.

5. The method of claim 1, wherein the field device is provisioned with a trust anchor to authenticate utility certificates using an established trust chain established by a manufacturer using manufacturer-signed utility certificates.

6. The method of claim 1, wherein the field device is provisioned by a manufacturer with a utility supplied trust anchor certificate used to authenticate field tool certificates.

7. A system for authenticating a field tool by a field device comprising:
    a field tool for performing tasks on one or more field devices of a plurality of field devices, wherein each field device of the plurality of field devices is configured to:
        receive, on the field device, an authentication certificate;
        verify the authentication certificate using a trust anchor certificate on the field device;
        secure communication between the field tool and the field device;
        receive a field tool task authorization certificate;
        verify the task authorization certificate using the trust anchor certificate on the field device;
        receive, from the field tool, a request to perform a task; and
        determine whether the task is authorized based on the task authorization certificate; and
        perform the task on the field device when it is determined the task is authorized.

8. The system of claim 7, further comprising:
    determining, by the field device, a list of field devices with which the field tool is authorized to communicate; and
    verifying that the field device is on the list of field devices.

9. The system of claim 7, further comprising generating, by the field tool, a public and private key pair and communicating the public key to a head end system process that constructs the authentication certificate for the field tool.

10. The system of claim 7, wherein the field device uses a public/private key challenge to authenticate the field tool using a public key of the field tool, wherein the public key is received from the field tool in the authentication certificate.

11. The system of claim 7, further comprising a certificate hierarchy wherein a manufacturer signs one or more utility certificates that establish a trust chain to authenticate the one or more utility certificates with a trust anchor provisioned in a manufactured device.

12. The system of claim 7, further comprising a certificate hierarchy wherein the field tool does not have a private key of the certificates the field tool is configured with.

13. The system of claim 7, further comprising a certificate hierarchy used by the field tool to authenticate devices wherein a manufacturer establishes a trust chain for one or more device certificates that comprises a manufacturing site certificate that signs the one or more device certificates that has a manufacturer certificate as the trust anchor.

14. The system of claim 7, further comprising a certificate hierarchy used by device to authenticate field tool certificates wherein the device is provisioned by a manufacturer with a utility supplied trust anchor certificate.

15. A field device for authenticating a field tool, comprising:
   a) at least one processor;
   b) at least one input device;
   c) at least one output device; and
   d) at least one storage device storing processor executable instructions which,
   when executed by the at least one processor, perform a method including:
      receiving, on the field device, an authentication certificate;
      verifying the authentication certificate using a trust anchor certificate on the field device;
      securing communication between the field tool and the field device;
      receiving a field tool task authorization certificate;
      verifying the task authorization certificate using the trust anchor certificate on the field device;
      receiving, from the field tool, a request to perform a task; and
      determining whether the task is authorized based on the task authorization certificate; and
      performing the task on the field device when it is determined the task is authorized.

16. The field device of claim 15, further comprising
   determining, from the authorization certificate, a list of field devices with which the field tool is authorized to communicate; and
   verifying that the field device is on the list of field devices.

17. The field device of claim 15, wherein the communication between the field tool and the field device is secured with a key, wherein the key is generated using a device certificate and the field tool task authorization certificate.

18. The field device of claim 15, wherein a public/private key challenge is used to authenticate the field tool using a public key of the field tool, supplied to the field tool in an authentication certificate supplied by the field tool.

19. The field device of claim 15, wherein the field device is provisioned with a trust anchor to authenticate utility certificates using an established trust chain established by a manufacturer using manufacturer-signed utility certificates.

20. The field device of claim 15, wherein the field device is provisioned by a manufacturer with a utility supplied trust anchor certificate used to authenticate field tool certificates.

\* \* \* \* \*